United States Patent [19]
Uemura et al.

[11] Patent Number: 5,568,258
[45] Date of Patent: Oct. 22, 1996

[54] METHOD AND DEVICE FOR MEASURING DISTORTION OF A TRANSMITTING BEAM OR A SURFACE SHAPE OF A THREE-DIMENSIONAL OBJECT

[75] Inventors: Ken Uemura; Yukiko Nagashima, both of Yokohama; Yasunari Saito, Funabashi; Takao Kurita, Yokohama; Tetsuo Miyake, Toyohashi; Kazuaki Shimizu, Yokohama, all of Japan

[73] Assignee: Asahi Glass Company Ltd., Tokyo, Japan

[21] Appl. No.: 428,838

[22] Filed: Apr. 25, 1995

Related U.S. Application Data

[63] Continuation of Ser. No. 934,214, Aug. 25, 1992, abandoned.

[51] Int. Cl.⁶ .................................................. G01B 11/24
[52] U.S. Cl. ........................................ 356/371; 356/239
[58] Field of Search .................................. 356/371, 237, 356/376, 239, 128, 124

[56] References Cited

U.S. PATENT DOCUMENTS

| | | | |
|---|---|---|---|
| 4,742,237 | 5/1988 | Ozawa | 356/376 |
| 4,794,262 | 12/1988 | Sato et al. | 356/376 |
| 4,847,510 | 7/1989 | Douglas | 356/371 |
| 4,853,777 | 8/1989 | Hupp | 356/376 |

FOREIGN PATENT DOCUMENTS

| | | | |
|---|---|---|---|
| 3021448 | 12/1981 | Germany | 356/371 |
| 122906 | 9/1981 | Japan | 306/371 |
| 100309 | 5/1988 | Japan | 356/371 |
| 1-129142 | 5/1989 | Japan . | |
| 3-44504 | 2/1991 | Japan . | |
| 9002310 | 3/1990 | WIPO | 356/237 |

*Primary Examiner*—Richard A. Rosenberger
*Attorney, Agent, or Firm*—Oblon, Spivak, McClelland, Maier & Neustadt, P.C.

[57] ABSTRACT

A method of measuring a distortion of a transmitting beam, characterized in that a transmitting beam is emitted from a beam generator and projected onto a screen as a bright spot, the bright spot is scanned over a surface of the screen, and a distortion of the transmitting beam is measured on the basis of a distance between a first location of the bright spot on the screen at a first time when the transmitting beam is incident on a beam receiving device in a specified incident direction upon transmitting through a measured body, and a second location of the bright spot on the screen at a second time when the transmitting beam is incident on the beam receiving device in the specified incident direction upon not transmitting through the measured body. A surface shape of a three-dimensional object may also be measured on the basis of a distance between a first location of the bright spot on the screen at a first time when the transmitting beam is incident on a beam receiving device in a specified incident direction upon being reflected from a surface of a three-dimensional measured body, and a second location of the bright spot on the screen at a second time when the transmitting beam is incident on the beam receiving device in the specified incident direction upon being reflected from a surface of a reference body. The present invention provides measurements having improved accuracy for objects of any size irrespective of the resolution of the beam receiving device.

6 Claims, 3 Drawing Sheets

METHOD AND DEVICE FOR MEASURING DISTORTION OF A TRANSMITTING BEAM OR A SURFACE SHAPE OF A THREE-DIMENSIONAL OBJECT

This application is a continuation of application Ser. No. 07/934,214, filed on Aug. 25, 1992, now abandoned.

BACKGROUND OF THE INVENTION

1. Field of the Invention

This invention relates to a method of measuring distortion and device for transmitting beam or a three-dimensional surface shape of a measured body.

2. Discussion of Background

Conventionally, as a method of measuring distortion of a transmitting beam or a three-dimensional surface shape of a glass plate or the like using a light beam, a method has been proposed wherein a transparent board with a black lattice pattern on its surface is disposed between a light source and a measured body, a transmitting image or a reflecting image of the lattice pattern is projected on a screen, and the distortion of the pattern is measured by optically observing the distortion of the pattern or by taking a photograph thereof followed by optical observation, either one of which is a general practice. However, in this method, a measurement error is apt to be caused by each individual measuring person. Furthermore, it is extremely inconvenient in view of the automation of the measurement.

Explanation will be given of the conventional measuring method taking an example of measuring the distortion of a transmitting beam. FIG. 6 is a conceptual diagram showing the conventional method.

Beam 11 is radiated on a measured body 12 such as a glass plate through a transparent meshed board 9 with a lattice having mesh intervals of 15 mm to 50 mm, and a lattice image formed by the transmitting beam is taken by a camera 13. By using an enlarged photograph obtained as above, deviation (inclination) of the lattice image with respect to a reference line is measured an is determined to be a quantity of the distortion of the transmitting beam. There also is a case wherein an operator performs optical observation by projecting a transmitting image of the lattice rather than taking the lattice image by a camera.

However, in such a method, since the deviation of the lattice image from the reference line is measured by the inclination, an extremely accurate reference line is required. Since the measurement is finally performed by optical observation, a dispersion of the measurement value is considerable depending on the observer, and therefore the accuracy is not sufficient. Furthermore, much time is required for the inspection.

A glass plate for an automobile is often provided with a small radius of curvature. Accordingly, to project the meshed image over a total surface of the glass plate, an extremely large screen or a surrounding screen is required. Therefore, size of the measuring the device is undesirably magnified.

This representation of the distortion by the inclination is not necessarily fitted to an actual observation. Even if the inclination of the surface of the glass plate is deviated from that of a reference value, so far as the surface is smooth, often the deviation is not a problem when a person actually observes the transmitting beam.

As a trial of reducing the inaccuracy of the measurement of the distortion of a transmitting beam by optical observation, a method is proposed in Japanese Unexamined Patent Publication No. 129142/1989 wherein a plate glass is intermittently rotated and a laser beam is radiated thereon, thereby calculating a refracting power of a specified point of the glass plate, which is determined to be the distortion of the transmitting beam.

However, in this method wherein the laser beam having a strong directivity is radiated directly on the glass plate, the measurement of the distortion of transmitting beam of the glass plate is performed only with respect to a specified point. Therefore, to measure the distortion of transmitting beam over the whole surface of the glass plate, a number of laser devices and beam receiving devices are required whereby the integrated device is magnified and expensive.

The applicant proposes to achieve the automation of the inspection removing the difference in the measurement error by each individual measuring person by measuring an incident direction of a beam which is emitted from a bright spot on a screen formed by radiating a laser beam or the like on the screen, and reflected by a measured body (Japanese unexamined Patent Publication No. 44504/1991). In this case, a beam receiving device is often utilized which is provided with a beam receiving plane composed of a great number of pixels such as a CCD camera or a video camera, since the scope thereof for receiving the transmitting beam or the reflecting beam is wide, which is suitable for efficient performance of the measurement.

However, when the measurement is performed on a measured body having a surface area of about several square meters such as a windshield glass for an automobile, time of several tens to about one hundred hours is required even by this method, since the beam receiving device such as a CCD camera or a video camera cannot detect the incident direction with an accuracy smaller than the size of a pixel. Thus, in measuring the distortion of a transmitting beam or a shape thereof with a required accuracy, the scope measurable by a single beam receiving device is extremely limited.

SUMMARY OF THE INVENTION

According to a first aspect of the present invention, there is provided a method of a measuring a distortion of transmitting beam which measures the distortion of a transmitting beam of a measured body by receiving a beam transmitted through the measured body by a beam receiving device, characterized in that the beam is emitted from a bright spot moving on a specified screen, and the distortion of the transmitting beam is measured based on a difference between a first location of the bright spot at a first moment when the beam receiving device receives the beam in an incident direction in a case wherein the beam transmits through the measured body and a second location of the bright spot at a second moment when the beam receiving device receives the beam in said incident direction in a case wherein the beam does not transmit through the measured body.

According to a second aspect of the present invention, there is provided a method of measuring distortion of a transmitting beam according to the first aspect, wherein the beam receiving device is provided with a beam receiving plane composed of a plurality of pixels and is capable of determining the incident direction of the beam by detecting which pixel receives the beam.

According to a third aspect of the present invention, there is provided a method of measuring distortion of a transmitting beam according to the second aspect, wherein a change of a detected first brightness of each of the pixels is measured and a moment of receiving the beam in said incident direction is determined to be when the detected first brightness agrees with a second brightness of a representative point previously specified on a curve of the change of the first brightness.

According to a fourth aspect of the present invention, there is provided a method of measuring distortion of a transmitting beam according to the first aspect, wherein the bright spot moving on the screen is formed by scanning the screen, which is approximately a plane, by a laser beam.

According to a fifth aspect of the present invention, there is provided a method of measuring a three-dimensional surface shape which measures a three-dimensional shape of a surface of a measured body by receiving a beam reflected from the surface of the measured body by a beam receiving device, characterized in that the beam is emitted from a bright spot moving on a specified screen, and the three-dimensional shape of the surface of the measured body is measured based on a difference between a first location of the bright spot at a first moment when the beam receiving device receives the beam in an incident direction in a case wherein the beam is reflected from the surface of the measured body and a second location of the bright spot at a second moment when the light receiving device receives the beam in said incident direction in a case wherein the beam is reflected from a reference plane.

According to a sixth aspect of the present invention, there is provided a method of measuring the three-dimensional surface shape according to the fifth aspect, wherein the beam receiving device is provided with a beam receiving plane composed of a plurality of pixels and is capable of determining the incident direction of the beam by detecting which pixel receives the beam.

According to a seventh aspect of the present invention, there is provided a method of measuring the three-dimensional shape according to the sixth aspect, wherein a change of a detected first brightness of each of the pixels of the beam receiving device is measured and a moment of receiving the beam in said incident direction is determined to be when the detected first brightness agrees with a second brightness of a representative point specified on a curve of the change of the first brightness.

According to an eighth aspect of the present invention, there is provided a method of measuring the three-dimensional shape according to the fifth aspect, wherein the bright spot moving on the screen is formed by scanning a laser beam on the screen which is approximately a plane.

According to a ninth aspect of the present invention, there is provided a device for measuring distortion of a transmitting beam or a three-dimensional surface shape by receiving a beam deviated by a measured body by a beam receiving device, comprising:

beam emitting mean for emitting a beam by forming a bright spot moving on a specified screen;

a beam receiving device capable of detecting an incident direction of the beam;

a stage for supporting the measured body which is capable of maintaining the measured body in a path of the beam emitted from the bright spot to the beam receiving device; and calculating means for calculating the distortion of the transmitting beam or the three-dimensional surface shape based on a difference between a first location of the bright spot at a first moment when the beam receiving device receives the beam in an incident direction in a case wherein the beam is deviated by the measured body and a second location of the bright spot at a second moment when the beam receiving device receives the beam in said incident direction in a case wherein the beam is not deviated by the measured body.

According to a tenth aspect of the present invention, there is provided a device for measuring distortion of a transmitting beam or a three-dimensional surface shape according to the ninth aspect, wherein the beam receiving device is provided with a beam receiving plane composed of a plurality of pixels and is capable of detecting the incident direction of the beam by detecting which pixel receives the beam.

According to a eleventh aspect of the present invention, there is provided a device for measuring distortion of a penetrated beam or a three-dimensional surface shape according to the tenth aspect, wherein the beam receiving device is capable of measuring a change of a detected brightness of each pixel, and the calculating means calculates the distortion of transmitting beam or the three-dimensional surface shape based on a difference between a first location of the bright spot in a case wherein the beam is deviated by the measured body and a second location of the bright spot in a case wherein the beam is not deviated by the measured body, both at a moment when a detected first brightness agrees with a second brightness of a representative point previously specified on a curve of the change of the first brightness.

According to a twelfth aspect of the present invention, there is provided a device for measuring distortion of the penetrated beam or the three-dimensional shape according to the ninth aspect, wherein the beam emitting means scans a laser beam on the screen which is approximately a plane.

DETAILED DESCRIPTION OF THE PREFERRED EMBODIMENTS

Figure 1:
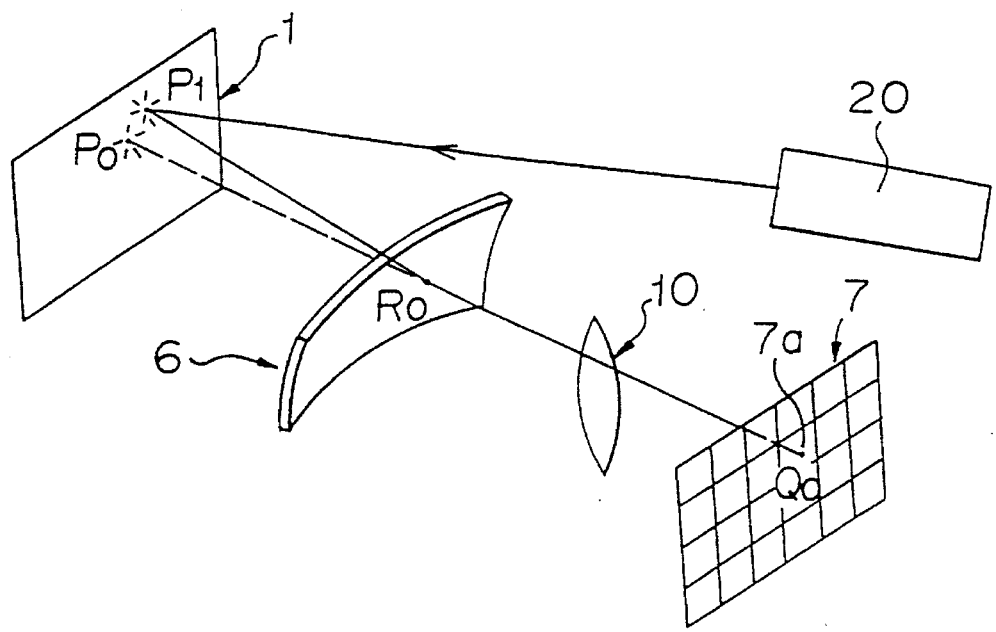
FIG. 1 is a conceptual perspective diagram showing an example of a construction for measuring distortion of transmitting beam of a transparent body.

FIG. 1 is a conceptual diagram showing a representative construction of a device for measuring distortion of a transmitting beam of this invention. A reference numeral 1 designates a specified screen wherein position of a bright spot is determined, and specifically, a screen for projecting an image or the like is utilized. Numeral 6 designates a glass plate which is a measured body, and 7, a beam receiving plane of a beam receiving device. Numeral 10 designates a lens for focusing a beam on the beam receiving plane, which is provided in accordance with the necessity.

$P_0$ and $P_1$ designate the bright spots on the screen 1. Each of $P_0$ and $P_1$ designates a state wherein the bright spot is in a different position at a different time. Specifically, this is produced by scanning a laser beam on the screen 1 having a pertinent roughness. In FIG. 1, numeral 20 designates a laser generator. A scanning device, not shown, scans the screen 1 with a laser beam emitted by the laser generator 20.

$Q_0$ is a specified point on a pixel 7a of the beam receiving plane 7, and has a one-to-one correspondence with a specified incident direction of the beam received by the beam receiving device. In FIG. 1, the position of the bright spot at the moment when the beam receiving device receives the beam in the specified incident direction corresponding to the specified point $Q_0$ is $P_0$ when the beam does not transmit through the measured body and $P_1$ when the beam transmits through the measured body. The difference in these positions is due to the distortion of transmitting beam at $R_0$, a point where the beam transmits through the glass plate 6. Accordingly, by measuring a moving quantity, $P_0$ to $P_1$ on the screen 1 which is produced by transmitting the beam through the glass plate 6 at a great number of points, a distribution of the distortion of the transmitting beam of the glass plate 6 can be measured.

An advantage of the invented method is that the measurement of the distortion of the transmitting beam having an accuracy which is extremely good compared with that of conventional methods, is made possible. Explanation will now be given to the reason.

Conventionally, the distortion of a transmitting beam is measured by measuring a quantity of distortion of the image of a reference lattice which is observed through the glass plate. The measurement accuracy is determined by the resolution of the photographing device or the resolution of the pixel, since the resolution of measuring the incident direction of the lattice image which is incident on the beam receiving device corresponds to the resolution of the pixel. However, the resolution of a normal video camera or the like is generally not so high that the device can detect the distortion of the image transmitted through a glass plate for an automobile windshield glass having a large area, with a required accuracy. Accordingly, it is necessary to measure the large area by dividing it in many portions, which requires an enormous amount of time as a result.

On the other hand, the invented method has been developed paying attention to the fact that the position of the bright spot emitting the beam can be determined with an accuracy far better than that of measuring the incident direction of the receiving beam. In this method, the distortion of the transmitting beam is measured based on a difference between the positions of the bright spot in a case wherein the beam transmits through the measured body and that in a case wherein the beam does not transmit through the measured body, at the moment when the beam receiving device receives the beam in a specified incident direction, using the criteria of the incident direction of the receiving beam at the beam receiving device. In this case, it is sufficient to determine the specified incident direction of the beam with good repeatability. The resolution of the beam receiving device is not a serious problem.

The incident direction which can be determined with high repeatability is distributed discretely, since the pixel of the beam receiving plane is provided discretely. This is not a serious problem in the measurement of the distortion of a transmitting beam since the distortion of the transmitting beam of the glass plate does not vary abruptly in a very small domain. Explanation will be given later as of an example of a method of determining the specified incident direction with good accuracy.

Figure 3:
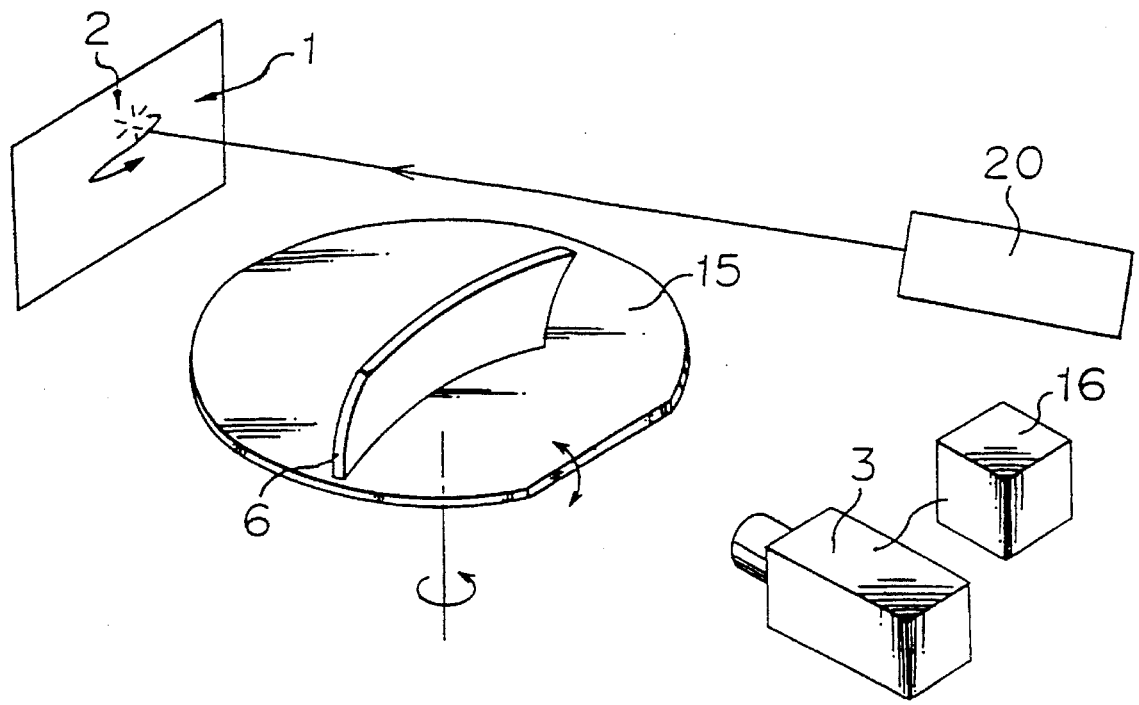
FIG. 3 is a conceptual perspective diagram showing a basic construction of an invented device.

Explanation will now be given to an example of a device for measuring the distortion of transmitting beam of a this invention. FIG. 3 is a perspective diagram of an outline of a basic construction of this invention, and reference numeral 6 designates a glass plate which is a measured body. Numeral 2 designates a bright spot moving on the screen 1, which is specifically produced by radiating a laser beam on the screen 1 while an accurate position thereof is being recognized by a laser scanner (not shown). Numeral 20 designates the laser generator. In principle, the bright spot 2 can be generated by utilizing a movable small light source such as a light emitting diode, or by arranging a great number of small light sources, which are turned on continuously and successively. However, currently, the above method is the most preferable since the bright spot can be moved with high accuracy at high speed.

As stated above, the position of the bright spot emitting the beam should be recognized accurately. The position of the bright spot can be known by corresponding it to time when the bright spot moves at predetermined timings and with high accuracy. The position of the bright spot may be detected by observing it directly by sensors.

To enhance the detecting accuracy of the position, it is extremely preferable that the breadth of the bright spot is small at least in one direction, and the position is easily recognized with high accuracy.

The expression "the breadth of the bright spot is small at least in one direction" does not insinuate simply a so-called point light source. Alternatively, there are point light sources arranged in a line, a point light source moving along a line and a line light source. Since the breadths of these are small at least in one direction, it is easy to enhance the detection accuracy of the position with respect to the direction. Taking the line light source as an example, the accuracy of the position can be enhanced in a direction orthogonal to the line. When the line light source is used, the accuracy of the position of the bright spot can be promoted by utilizing two or more line light sources having different directions.

The breadth of the bright spot is preferably to be ten times or less a first length at the light source position which corresponds to a second length of a resolution limit of the beam receiving device (for instance the size of a pixel when the beam receiving device is provided with a beam receiving plane composed of a great number of pixels), more preferably five times or less. The bright spot having a breadth exceeding the corresponding length of the resolution limit is effective, because actually there is a brightness distribution in the bright spot per se. For instance, when the size of the pixel on the beam receiving plane of a CCD camera of 10 $\mu m^2$ corresponds to 1 $mm^2$ on the screen, the breadth of the bright spot is to be 10 mm or less at least in one direction and preferably 5 mm or less.

Numeral 16 designates a calculating device for representing the obtained signal as a value of the distortion of the transmitting beam. Numeral 3 designates a beam receiving device such as a CCD camera, which receives the beam from the bright spot 2. The beam receiving device 3 is not restricted to this type and any device capable of specifying the incident direction of the beam such as a video camera or a still camera, will suffice. Furthermore, a device wherein photo-sensors are arranged in a matrix is preferably utilized. Especially, when a beam receiving plane of an image-taking element of a beam receiving device is composed of a plurality of pixels, the incident direction of the beam can simply be measured by detecting which pixel receives the beam, and handling thereof as data can easily be performed.

The size of the screen 1 restricting the bright spot 2 in the example, is preferably determined by the size and the shape of the glass plate 6 which is the measured body, the distance between the beam receiving device 3 and the screen 1, and the position of the beam receiving device 3. When the glass plate 6 which is the measured body is comparatively large such as a windshield glass for on an automobile, it is preferable to rotate the stage 15 fixed with the glass plate 6 horizontally and vertically to measure the distortion of the transmitting beam over the whole surface thereof.

An example of the arrangement is as follows. The beam receiving device 3 is disposed at the position of an eye of an operator. The distance between the beam receiving device 3 and the screen 1 is determined to be about 3 m. When the glass plate 6 is capable of rotating horizontally by a step of 30° and vertically by 50° with a center thereof at the eye position, the size of the screen 1 is about 3 m×3 m. Naturally, the distance between the screen 1 and the beam receiving device 3 and the rotating step are not restricted to these values and are appropriately adjustable. However, as for the size of the rotating step, so far as a planar screen is used for the screen, when it is too large, the scope of the camera is too wide, which causes distortion at ends of the scope, whereas when it is too small, a swift measurement cannot be performed, since it requires a procedure of rotating the glass plate 6 for many times. Therefore, the rotating step is preferably 10° to 50°. In the invented device, it is preferable for promoting the accuracy to enlarge the distance between the glass plate 6 which is the measured body and the screen 1 and the distance between the screen 1 and the beam receiving device 3. However, when they are too large, the screen 1 must be magnified. Therefore, the distances are preferably about 2 to 5 m. The number beam receiving devices is not restricted to one and may be two or more. In this case, the glass plate 6 is divided into a plurality of portions, each of which is measured by separate beam receiving devices, and thereafter, the measured values are consolidated into a measured value of the total surface of the glass plate.

In the above example, the measurement is performed in a case wherein there is no measured body. Actually, the position of the bright spot at the moment when the beam receiving device receives the beam in a specified incident direction can be obtained by calculation based on a geometry of the positions of the screen, the measured body and the beam receiving device. However, when the difference of the positions of the bright spots is provided by performing an actual measurement, the aberration of the lens system, or the measurement error of the position of the bright spot or the like is almost canceled out, which is extremely preferable in view of the enhancement of the accuracy.

In this example, the glass plate is chosen as the measured body. However, the measured body may be any object so far as it is transparent.

Next, explanation will be given to an example of a method of determining a specified incident direction in the beam receiving device with high accuracy as follows.

Figure 4:
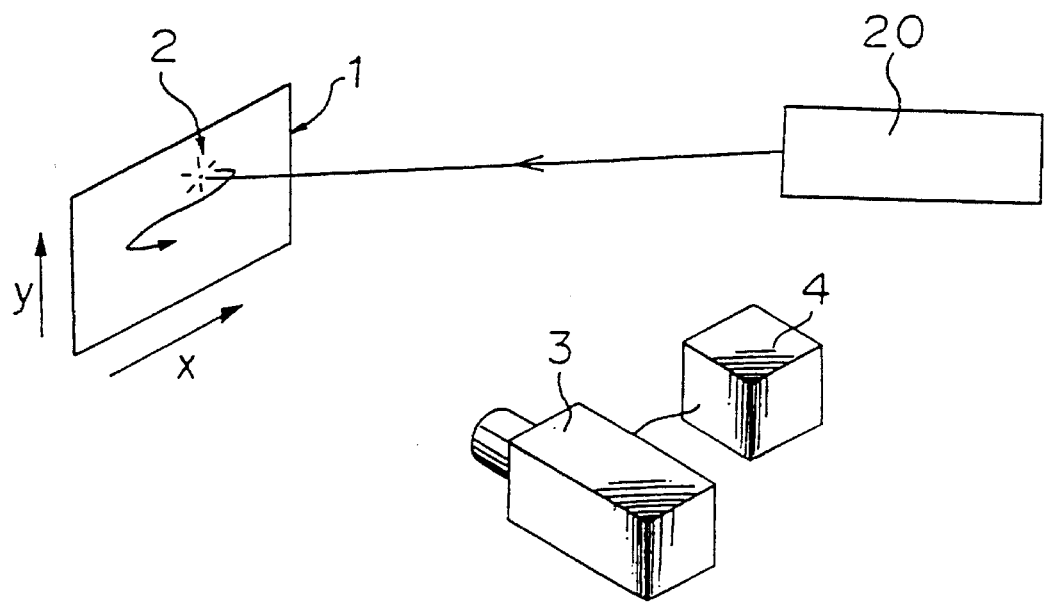
FIG. 4 is a perspective showing a concept of determining a specified incident direction.

FIG. 4 is a conceptual perspective diagram showing construction of the invented method. Reference numeral 1 designates a screen which restricts the moving of the bright spot two-dimensionally, 2, the bright spot moving on the screen 1, 3, the beam receiving device having the light receiving plane composed of a plurality of pixels, and 4, a calculating device for detecting the moment wherein the beam is received in a specified incident direction by measuring a detected brightness with respect to each pixel of the beam receiving device.

The bright spot 2 is movable in the directions of X and Y as in FIG. 1. Specifically, it is produced by scanning the laser beam on the screen, the surface of which is provided with light scattering property. The beam from the bright spot 2 is focused on the beam receiving plane of the beam receiving device 3 through a lens system incorporated in the beam receiving device 3.

Furthermore, the beam receiving device 3 may be provided with a beam receiving plane composed of a plurality of pixels as in a video camera or a CCD camera.

The calculating device 4 is provided with a means for measuring a change of a brightness of an incident beam with respect to each pixel. Since the brightness change curve has a general pattern, a representative point can be specified on the brightness change curve. The calculating device is further provided with means for detecting the moment when a brightness of the representative point is detected.

It is natural and preferable to utilize a point showing the maximum brightness on the brightness change curve as the representative point. However, it may be determined otherwise. Explanation will now be given of an example wherein the point showing the maximum of the brightness is the representative point, for simplicity.

Figure 5:
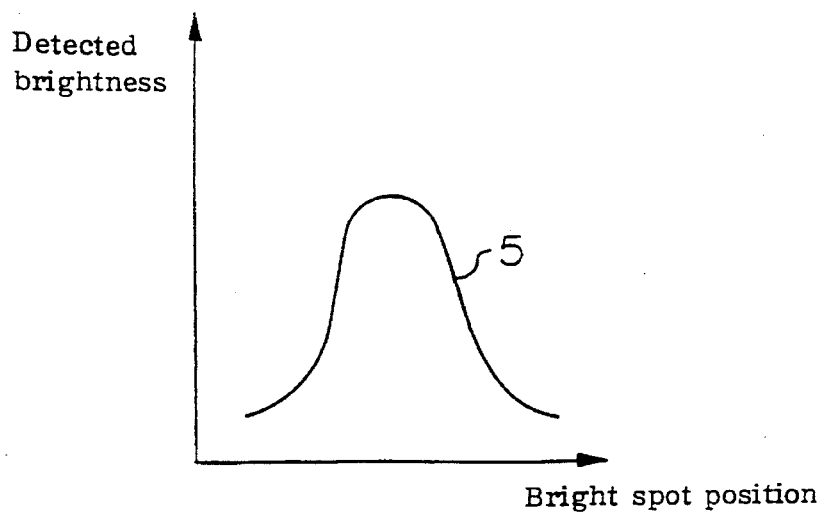
FIG. 5 is a conceptual diagram of a change of a detected brightness when a specified pixel of a beam receiving device receives a beam from a bright spot.
Figure 6:
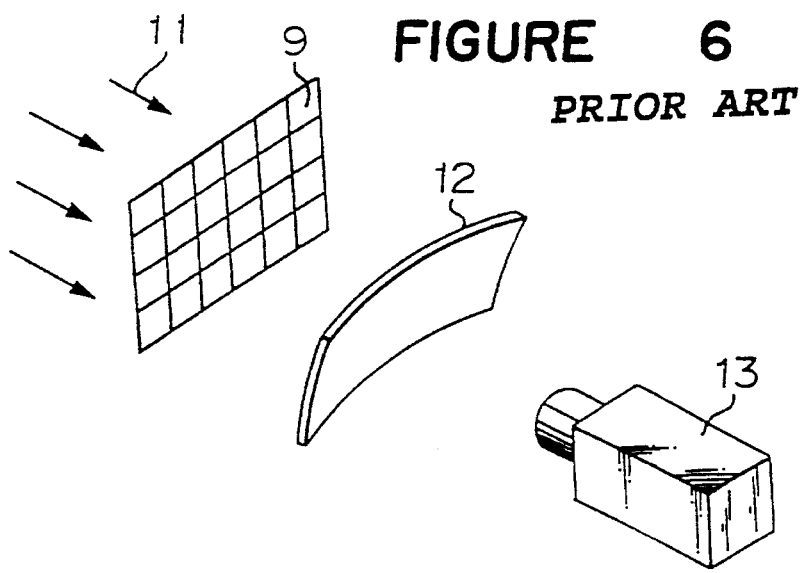
FIG. 6 is a conceptual diagram showing a conventional method of measuring distortion of a transmitting beam.

FIG. 5 is a graph showing a change of a detected brightness when the beam from the bright spot is received at a specified pixel of the beam receiving device 3. The ordinate represents the detected brightness and the abscissa represents a coordinate of the bright spot 2 on the screen 1 at the moment of detection. In this method, since the moving of the bright spot is two-dimensionally restrained, two kinds of graphs are provided, which have coordinates of X and Y directions as the abscissa.

The curve 5 of the detected brightness is a curve having a maximum value as shown in FIG. 5. Since the position of the bright spot at the moment showing the maximum value of the curve (which is the representative point of the detected brightness change curve) is accurately known as stated above, the correspondence of a specified incident direction at the moment showing the maximum of the detected brightness with the coordinate of the bright spot 2 on the screen 1 at the moment of receiving the beam in the incident direction can be provided.

As a method of representing the distortion of a transmitting beam as in the conventional example, the method wherein the distortion of the transmitting beam is represented by the inclination of the lattice pattern which is produced by transmitting the lattice pattern image through the measured body, from the reference line, is generally utilized. To correspond to the representation of the distortion of a transmitting beam in the conventional method, the bright spots are assumed to be distributed in a lattice. The distortion of a transmitting beam which is obtained by the invented method can simply be converted by interpolation into the inclination caused in the lattice image created by transmitting the lattice image through the glass plate 6.

However, as stated above, the distortion of transmitting beam of a glass plate or the like may not be a problem when a person actually recognizes by optical observation when the surface of the glass plate is smooth, even in a case wherein the inclination of the surface thereof is more or less deviated from that of a design value. Therefore, the representation by the inclination is not necessarily fitted to the actual observation.

Accordingly, in the actual reduction of the present invention, it is preferable to utilize a value converted by the following method as the distortion of transmitting beam. First, the difference between the positions of the bright spots caused by whether the beam transmits through the measured object or not is provided by the invented method. This can be provided at every point where the beam transmits through the measured body ($R_0$ in FIG. 1), thereby providing a distribution thereof on the measured body. Next, this value is converted into the difference of the beam receiving positions caused by whether the beam transmits through the measured body or not, in a case wherein the bright spots are distributed at constant intervals on the screen. This conversion is performed by interpolating the distribution of the above value. Next, the distortion of the transmitting beam is represented by a curvature obtained by differentiating the difference in the beam receiving positions in a specified direction.

This method has an advantage wherein the smoothness of the surface can be evaluated by the size of the curvature. Furthermore, the detection of inflection points is easy.

In this case, depending on the direction of the differentiation, values of different curvatures are obtained. Accordingly, by measuring the values of the curvatures in a plurality of mutually different directions, the evaluation of the smoothness at the measuring point becomes highly reliable.

Figure 7:
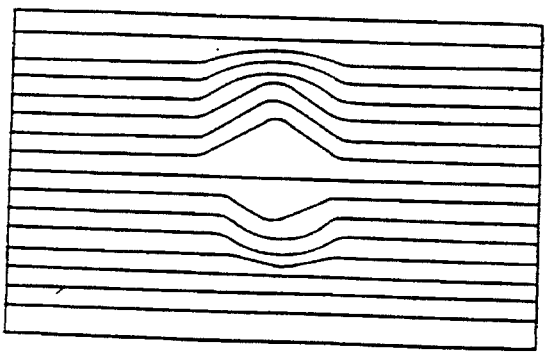
FIGS. 7 and 8 are distribution diagrams of distortion of a transmitting beam which is measured by the invented method.
Figure 8:
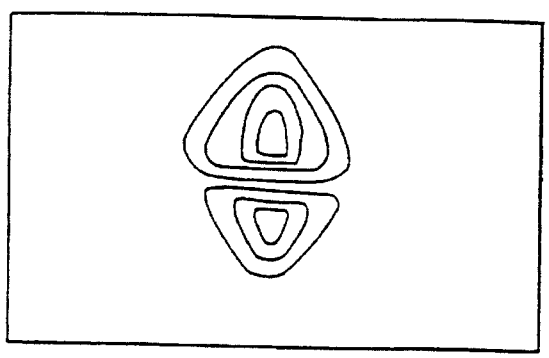

FIG. 7 is a conceptual diagram showing an example wherein parallel stripes are represented as the distortion of a transmitting beam. Furthermore, FIG. 8 is a conceptual diagram showing an example wherein the values of the curvatures are shown in contour lines. Especially in FIG. 8, the value of the distortion of a transmitting beam is quantitatively and visually understandable.

Figure 2:
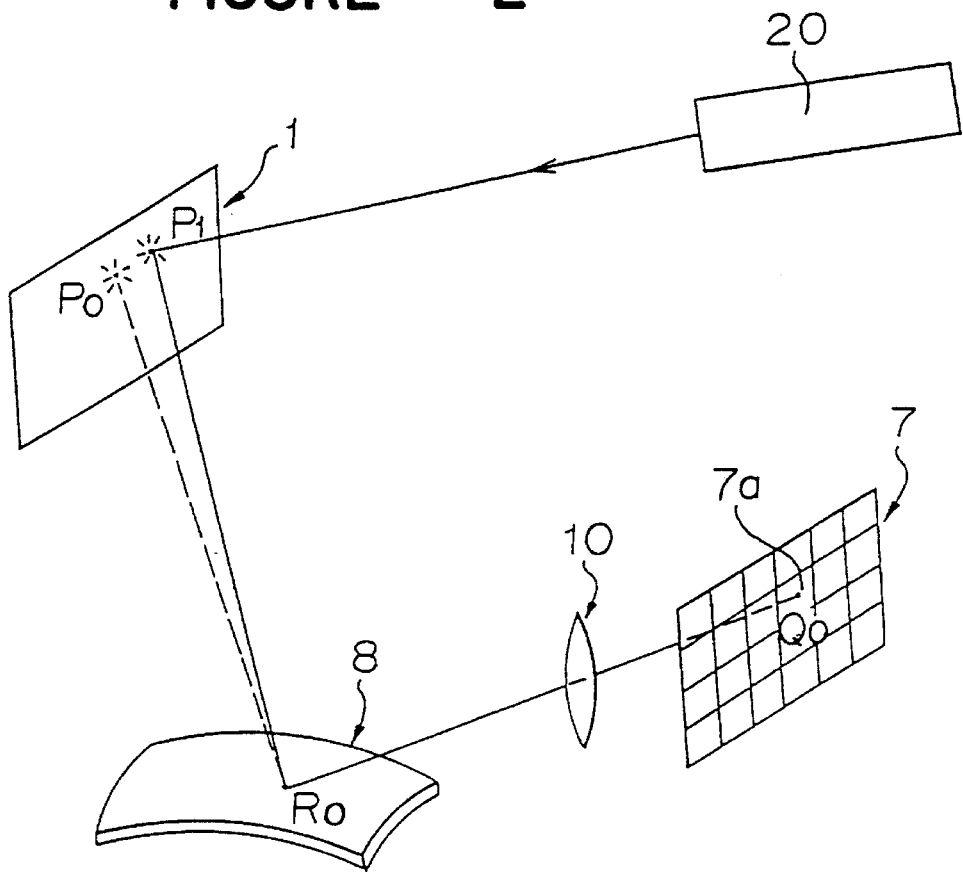
FIG. 2 is a conceptual perspective diagram showing a construction for measuring a three-dimensional surface shape of a light-reflecting body.

The invented method is applicable to a method of measuring a three-dimensional surface shape of a body having a beam-reflecting surface. FIG. 2 is a conceptual perspective diagram thereof. Numeral 8 designates a glass plate which is the measured body.

$P_0$ and $P_1$ designate bright spots on the screen 1. Each of $P_0$ and $P_1$ shows a state wherein the bright spot is in a different position at a different time. Specifically, this also is produced by scanning a laser beam on the screen 1.

$Q_0$ is a specified point of the pixel 7a of the beam receiving plane 7, which makes a one-to-one correspondence with a specified incident direction of the beam received by the beam receiving device. In FIG. 2, the position of the bright spot at the moment wherein the beam receiving device receives the beam in the specified incident direction $Q_0$, is $P_0$ when the beam is reflected by a light-reflecting body of which surface shape is previously known with high accuracy, and $P_1$ when the beam is reflected by the glass plate 8. The difference in these positions is due to the difference in the inclination of the surfaces of the reference light-reflecting body and the glass plate 8 at $R_0$ which is the beam reflecting point of the glass plate 8. Accordingly, by measuring a moving quantity of the beam, $P_0$ to $P_1$ on the screen 1 which is produced by reflecting the beam from the glass plate 6 at a great number of points, the surface shape of the glass plate 6 can be measured. The inclination of a surface at an arbitrary point on the glass plate 8 can simply be obtained by interpolation.

In the above example, the inclination of the surface is measured by the difference between the reflection at the surface of the glass plate 8 and the reflection at the surface of the reference beam-reflecting body. Actually, it is possible to obtain the position of the bright spot at the moment when the beam receiving device receives the beam in a specified incident direction by calculation based on a geometry of the positions of the screen, the measured body, and the beam receiving device. However, by obtaining the difference of the positions of the bright spots by an actual measurement, the aberration of the lens system and the measurement error of the position of the bright spot or the like can almost be canceled out, which is extremely preferable in view of the enhancement of the accuracy.

The application of the present invention is extremely broad so far as it does not impair the effect. Not only the measurement of the distortion of a transmitting beam, and the measurement of the three-dimensional surface shape as stated above, but also the measurement of a distortion of a reflecting beam of the surface can be achieved by a device having a similar construction and by a similar method.

According to the present invention, the incident direction of the beam is specified substantially with the resolution of ten times or more of the size of a normal pixel (5 to 15 $\mu m^2$) of the beam receiving device. Furthermore, by using the data, the distortion of a transmitting beam of a transparent body and a three-dimensional surface shape of a beam-reflecting body can be measured with an extremely high accuracy and at high speed. In the conventional technology, several tens of hours or more are required in the measurement for the glass plate for an automobile windshield. However, by utilizing the present invention, the time is reduced to two to three hours. In this way, the distortion of a transmitting beam of an experimental product of a glass plate can be known in a comparatively short time, which can be a strong tool in determining a design of the glass plate. According to the invented method, since an objective measurement of the distortion of a transmitting beam can be performed, this invention explores a way for standardization of the measurement of the distortion of a transmitting beam and the industrial value of utilization thereof is considerable.

What is claimed is:

1. A method of measuring a distortion of a transmitting beam, characterized in that:

a transmitting beam is emitted from a beam generator and projected onto a screen as a bright spot;

said bright spot is scanned over a surface of said screen;

a beam receiving device is provided with a beam receiving plane comprising a plurality of pixels and brightness distribution curves are generated for each of said plurality of pixels of said beam receiving device by measuring and recording a degree of brightness detected at each of said plurality of pixels during each time period when said bright spot changes position while scanning over said surface of said screen and selecting a representative point representing a degree of brightness on a brightness distribution curve corresponding to each of said plurality of pixels;

a first location of said bright spot on said screen is determined at a first time when a measured degree of brightness at a given one of said plurality of pixels is equal to a degree of brightness represented by a representative point on a brightness distribution curve corresponding to said given one of said plurality of pixels upon transmitting through a measured body, and a second location of said bright spot on said screen is determined at a second time when a measured degree of brightness at said given one of said plurality of pixels is equal to a degree of brightness represented by a representative point on a brightness distribution curve corresponding to said given one of said plurality of pixels upon not transmitting through said measured body; and a distortion of said transmitting beam is measured on the basis of a distance between said first location and said second location.

2. The method of measuring a distortion of a transmitting beam according to claim 1, wherein said bright spot scanning over said surface of said screen is produced by a laser beam generated by said beam generator, and said surface of said screen approximately forms a plane.

3. A method of measuring a surface shape of a three-dimensional object, characterized in that:

a transmitting beam is emitted from a beam generator and projected onto a screen as a bright spot;

said bright spot is scanned over a surface of said screen;

a beam receiving device is provided with a beam receiving plane comprising a plurality of pixels and brightness distribution curves are generated for each of said plurality of pixels of said beam receiving device by measuring and recording a degree of brightness detected at each of said plurality of pixels during each time period when said bright spot changes position while scanning over said surface of said screen and selecting a representative point representing a degree of brightness on a brightness distribution curve corresponding to each of said plurality of pixels;

a first location of said bright spot on said screen is determined at a first time when a measured degree of brightness at a given one of said plurality of pixels is equal to a degree of brightness represented by a representative point on a brightness distribution curve corresponding to said given one of said plurality of pixels upon being reflected from a surface of said three-dimensional object, and a second location of said bright spot on said screen is determined that a second time when a measured degree of brightness at said given one of said plurality of pixels is equal to a degree of brightness represented by a representative point on a brightness distribution curve corresponding to said given one of said plurality of pixels upon being reflected from a surface of a reference body; and a surface shape of said three-dimensional object is measured on the basis of a distance between said first location and said second location.

4. The method of measuring a surface shape of a three-dimensional object according to claim 3, wherein said bright spot scanning over said surface of said screen is produced by a laser beam generated by said beam generator, and said surface of said screen approximately forms a plane.

5. A device for measuring a distortion of a transmitting beam or a surface shape of a three-dimensional object, comprising:

beam emitting means for emitting a transmitting beam, projecting said transmitting beam onto a screen as a bright spot, and scanning said bright spot over a surface of said screen;

beam receiving means having a plurality of pixels, wherein brightness distribution curves are generated for each of said plurality of pixels of said beam receiving device by measuring and recording a degree of brightness detected at each of said plurality of pixels during each time period when said bright spot changes position while scanning over said surface of said screen and selecting a representative point representing a degree of brightness on a distribution curve corresponding to each of said plurality of pixels;

support means for supporting said three-dimensional object and maintaining said three-dimensional object in a path of said transmitting beam between said screen and said beam receiving means; and calculating means for calculating a distortion of said transmitting beam or a surface shape of said three-dimensional object on the basis of a distance between a first location of said bright spot on said screen determined at a first time when a measured degree of brightness at a given one of said plurality of pixels is equal to a degree of brightness represented by a representative point on a brightness distribution curve corresponding to said given one of said plurality of pixels upon being deviated by said three-dimensional object, and a second location of said bright spot on said screen determined at a second time when a measured degree of brightness at said given one of said plurality of pixels is equal to a degree of brightness represented by a representative point on a brightness distribution curve corresponding to said given one of said plurality of pixels upon not being deviated by said three-dimensional object.

6. The device for measuring distortion of a transmitting beam or a surface shape of a three-dimensional object according to claim 5, wherein said bright spot scanning over said surface of said screen is produced by a laser beam generated by said beam emitting means, and said surface of said screen approximately forms a plane.

* * * * *